Figures 1, 2:
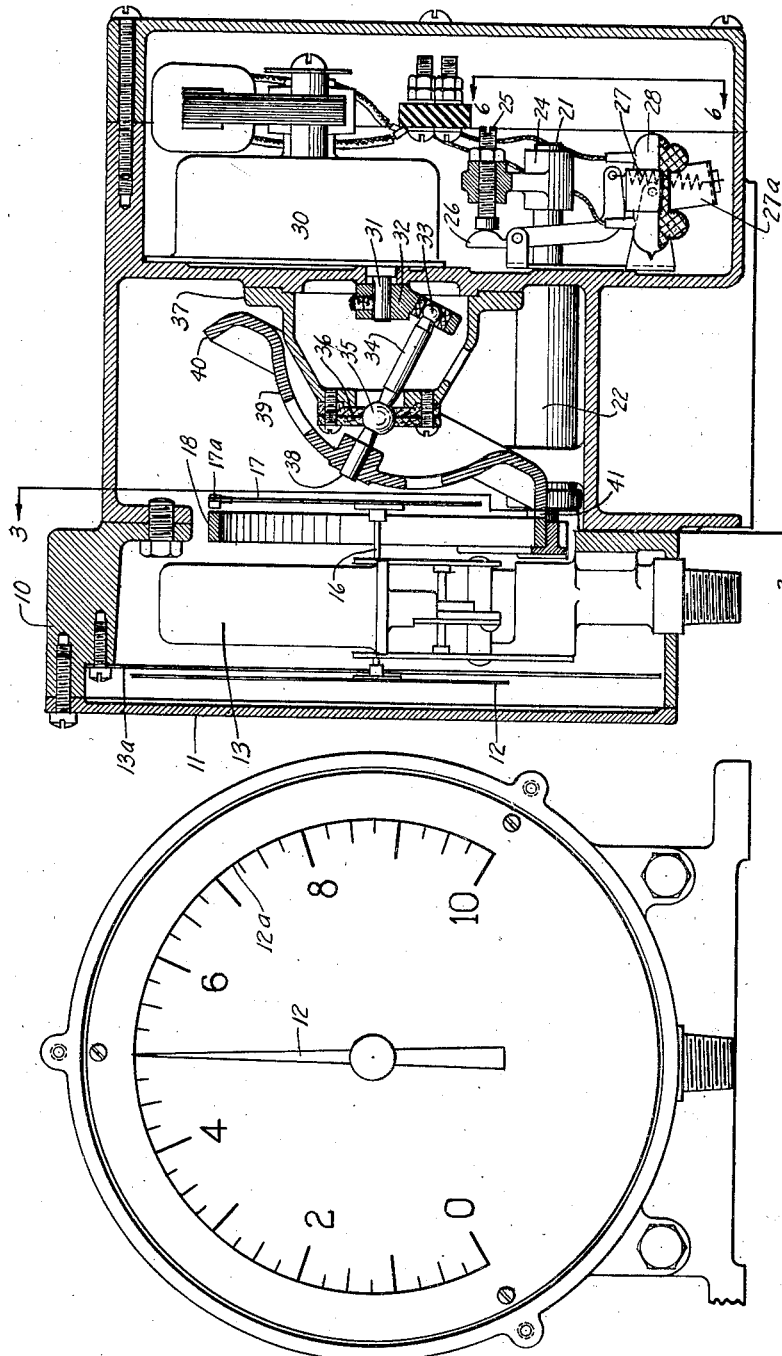

May 25, 1937.  F. R. THOMPSON  2,081,414
TELEMETRIC TRANSMITTER
Filed Nov. 30, 1934  3 Sheets-Sheet 1

INVENTOR.
Franklin R. Thompson.
BY
ATTORNEY.

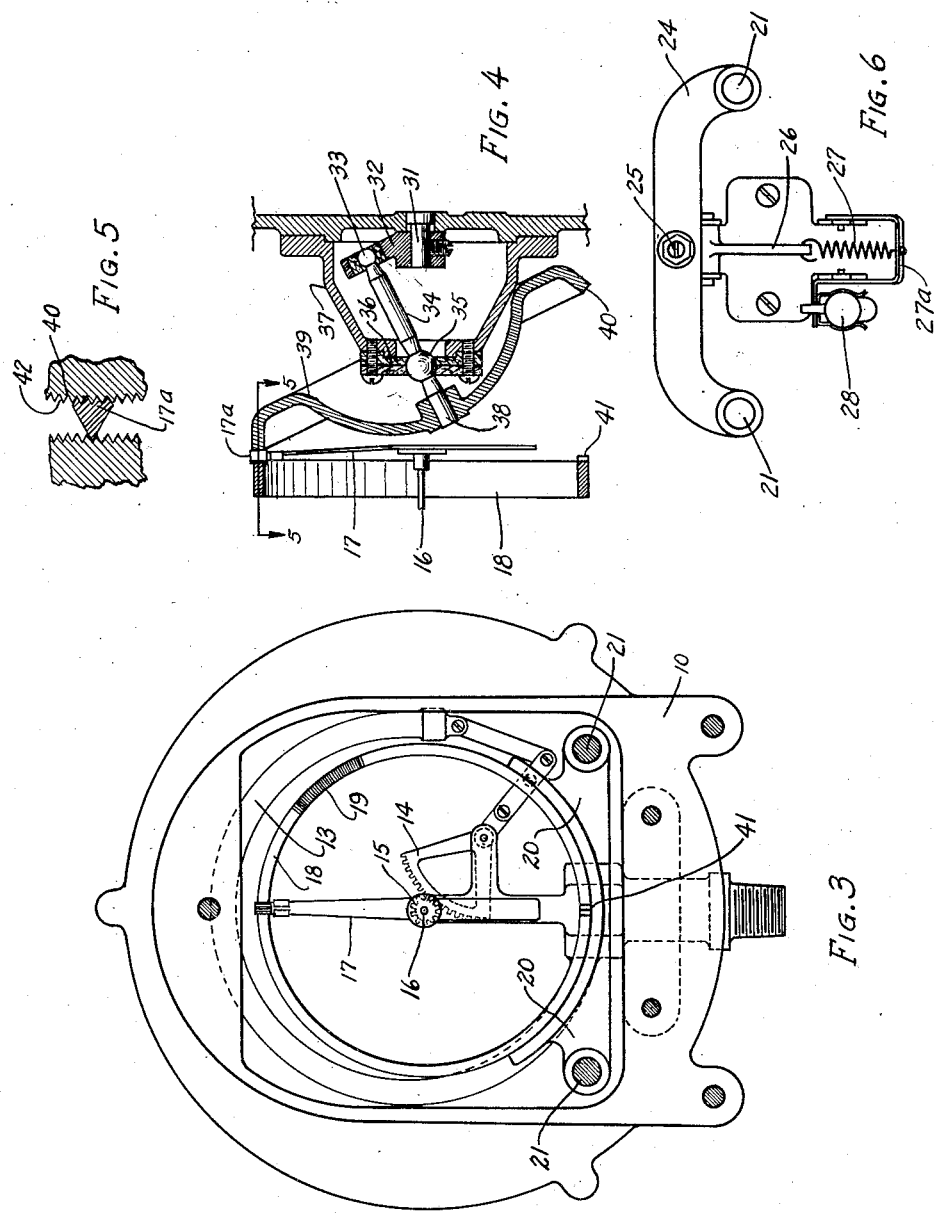

May 25, 1937.  F. R. THOMPSON  2,081,414
TELEMETRIC TRANSMITTER
Filed Nov. 30, 1934   3 Sheets-Sheet 3
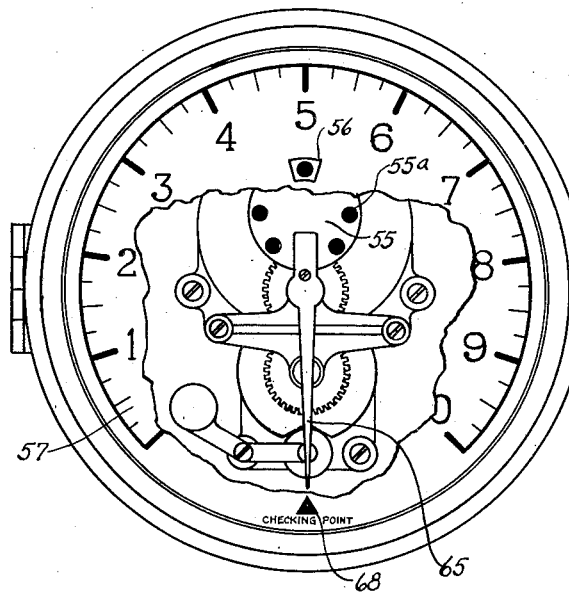
FIG. 7
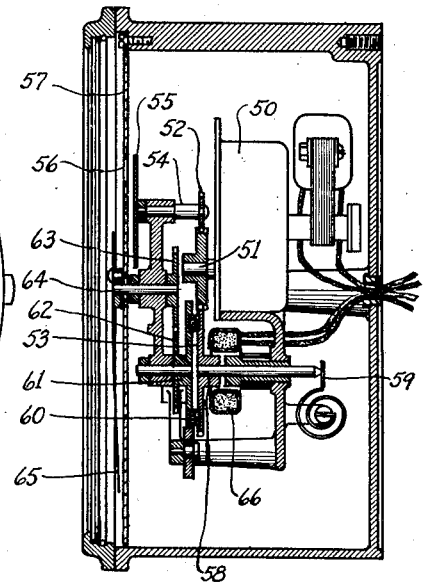
FIG. 8
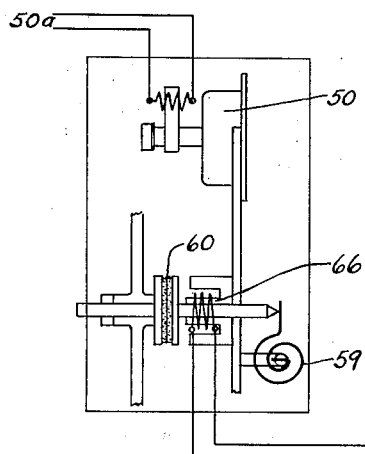
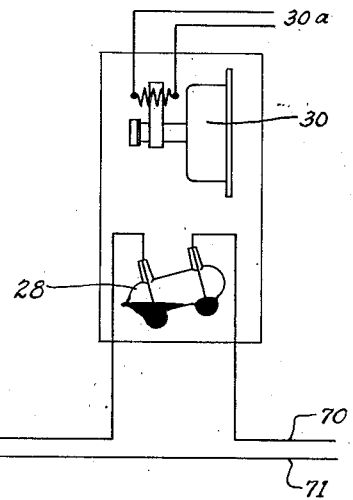
FIG. 9
Franklin R. Thompson INVENTOR
BY
ATTORNEY Patented May 25, 1937

2,081,414

UNITED STATES PATENT OFFICE 2,081,414

TELEMETRIC TRANSMITTER

Franklin R. Thompson, Stamford, Conn.

Application November 30, 1934, Serial No. 755,429

15 Claims. (Cl. 177—351)

This invention relates to a transmitter to be used in a telemetric system in which the reading of an indicating device is to be transmitted a considerable distance to a receiving device.

More particularly, this invention relates to an improved type of transmitter usable with the invention disclosed in the combination of my co-pending application 663,453, filed March 30, 1933, for a Method of and means for effecting remote indications.

In the transmitting instruments of the prior art, much study has been given to a method of transmitting the indication so as not to affect in any way the reading of the indicating instrument. In my application indicated supra, I show and claim one form of transmitter which embodies a radical departure from the prior art in that there is no contact between the indicator and the transmitting device, so that the usual problems present in such systems are avoided. It is usual to pass a contacting device over the indicator of the instrument to be read, the contacting device being adapted to send forth a signal at the time of contacting the indicator, this signal being received by an appropriate receiving instrument, as will be understood by those skilled in the art.

When the contacting device makes contact with the indicating member, it generally moves the indicator somewhat in its indicating path, and thus contributes an erroneous reading, as will be appreciated by those skilled in this art. While various means have been devised to avoid this error, none have been quite completely successful. My invention relates particularly to means for obtaining an accurate transmission of the reading of the indicator by the making of proper contact between the contacting device and the indicating member. In describing my invention, I shall refer to an indicating member as contacted by a contacting device, but it should be understood that a separate element moving in a path as a function of a value and having no indicating function, may be used with the same effect. I prefer to use a mechanical contact whereby the indicator or the said separate element serves to move a signalling member when contacted by the contacting device. Naturally, an electrical contacting arrangement may easily be devised.

More in detail, my invention comprises an indicating member which is adapted to flex comparatively easily relatively to its axis of rotation. Flexing of the indicator is preferred, although the indicating member may be pivoted or otherwise secured for movement out of its indicating plane, and may possibly have no movement at all in some adaptations of the principles of my invention. I arrange a special type of contacting member which moves in cycles relatively to the indicating device, but which has a compound movement so that a portion thereof is always moving substantially perpendicularly to the indicating member. It, therefore, so contacts the indicating member that it tends to move that member out of its plane, if it is adapted to move that member at all, and has no tendency whatsoever, or no appreciable tendency, to move the indicating member in an indicating direction.

Even more in detail, I mount a signalling member at one side of the indicating member so that the flexing of the indicating hand by the contacting member is adapted to cause movement of the signalling member, which movement is adapted to close a signalling circuit.

While I will disclose a particular detailed modification of my transmitting device and will describe it with relation to the particular receiving device I have disclosed in my co-pending application already referred to, it should be understood that this invention is relatively broad and may be produced in various forms, and that it is usable with many other types of receiving devices.

For a detailed description of my invention, I shall now refer to the drawings wherein Fig. 1 is a section of the transmitting instrument, and Fig. 2 is a front view thereof. Fig. 3 is a section taken along the lines 3—3 of Fig. 1. Fig. 4 is a view showing certain parts of Fig. 1 in a modified position. Fig. 5 is a partial section taken along the lines 5—5 of Fig. 4. Fig. 6 is a view of parts of Fig. 1 taken in the direction of the arrows 6—6 of Fig. 1. Fig. 7 is a front partially cut away view of the receiving instrument, and Fig. 8 is a section therethrough. Fig. 9 is a diagram of one of the circuits with which the system may be made operative.

Referring now more particularly to the drawings, and especially Figs. 1 to 5 inclusive, reference numeral 10 designates a casing having a front glass-covered portion 11 through which the indicator 12 and the dial 12a are visible. This indicator may be of any particular type, but in the present modification I show it as actuated by the Bourdon tube 13 through the gear sector 14 and the pinion 15 secured to the shaft 16 on which the indicator is mounted. At the rear end of the shaft 16, there is mounted a further indicator 17 which moves with the indicator 12 and assumes the same position as that indicator depending upon the pressure applied to the Bourdon tube 13.

Looking at Fig. 1, just to the left of the indicator 17, there is a circular or ring member 18, shown also in Fig. 3, having a serrated edge surface 19 and relatively to which the indicator 17 rotates, the indicator being spaced somewhat from the serrated surface 19 as will be readily seen from the drawings. Ear members 20 are secured to the ring 18 and carry shafts 21 which are mounted for sliding movement in cylinders 22, there being springs (not shown) in the cylinders normally urging the shafts 21 and the ring 18 toward the right, looking at Fig. 1.

The ends of the shafts 21 carry a bracket member 24, best illustrated in Figs. 1 and 6, which member supports an adjustable screw stud 25 adapted to control the lever 26 which, through a toggle lever 27a controlled by spring 27, is adapted to actuate a mercury switch 28. When the ring member 18 is urged to the left, as will be described hereinafter, the lever 26 acts through spring 27 and lever 27a to move the switch into closed position. (Fig. 1.) On reverse movement, the switch is actuated into open position.

At 30 I illustrate a synchronous motor which is adapted to rotate a shaft 31 carrying a crank member 32 having universal connection at 33 with a shaft 34 which, in turn, is mounted for universal movement through a ball portion 35 moving in the bearing 36 carried by the bracket 37. A continuation of the shaft 34 is fixed at 38 to a peculiar cup-shaped member 39. It will be readily understood that, as the shaft 31 is rotated, it acts through its member 32 and the shaft 34 to contribute a rolling motion to the cup-shaped member 39, which motion is adapted to bring a small increment of the peripheral edge 40 of the cup member in juxtaposed relation to the serrated surface 19 of the ring member 18. The motion of the cup member 39 is such, furthermore, that a constantly changing increment of the edge 40 will always be approaching juxtaposed relation to the ring 18, while the increment then in juxtaposed relation is leaving that relation. It will be understood, furthermore, that the approaching increment and the withdrawing increment both move substantially perpendicularly to the ring 18 and to the indicator 17. This particular movement of the cup member is especially important in the contribution I have made to this art.

Before describing the general operation of the transmitter, I should like to indicate that there is a fixed lug 41 secured to the ring member 18 which lug represents a checking point, as will be indicated later on, or may represent a zero or basic point depending, of course, on the particular type of receiving device to be utilized in connection with the transmitter. It will be well to indicate that the lug 41 is preferably serrated in the same way as the ring 18 is serrated. It will also be well to indicate that the edge surface 40 of the cup member 39 is also preferably serrated as at 42.

I shall now describe the operation of the transmitting device as follows. The synchronous motor 40 rotates the cup member 39 in cycles relatively to the ring 18 and the indicator 17. Once in each cycle the always changing increment thereof approaching juxtaposed relation to the ring 18 is adapted to have its serrated portion 42 engage the serrated surface of lug 41 on ring 18, thus forcing ring 18 to the left as in Fig. 1. This movement contributes motion to the shafts 21 which act through their bracket 24 and the stud screw 25 to move the lever 26 to its position of Fig. 1 in which position the lever 26 through its spring 27 and toggle lever 27a positions the mercury switch device 28 so that a circuit is made therethrough. As soon as the contact increment moves off the lug 41, the circuit will be broken by the movement of the ring and its shafts 21 back to the right, looking at Fig. 1.

Also, once during each cycle of rotation of the cup member 39, the increment thereof approaching the indicating device 17 engages its serrated surface 17a, as shown in Figs. 4 and 5, thus flexing the indicator 17 relatively to its shaft 16 against the ring 18. This action tends to move the ring 18 in the same manner as that ring is moved when the cup member 39 contacts lug 41. This causes the sending forth of a signal in the same manner as when lug 41 is contacted, as has already been described. Naturally, because the particular increment of the edge 40 of the cup member 39 approaches the serrated head 17a of the indicator 17 in a direction perpendicular to the path of movement of the indicator 17, it will act to flex the indicator against the ring 18 without tending in any way to contribute a movement to the indicator in an indicating direction. In this way extreme accuracy in the sending forth of the indicating signal is possible. Naturally, it is possible to close the circuit upon contact of cup member 39 with indicator 17 or lug 41, but I prefer the mechanical switching means described.

It is thought that those skilled in the art will now appreciate just how the particular transmitting system is usable in the usual telemetric systems now developed. However, to more clearly describe the invention, a receiving device has been illustrated in Figs. 7 and 8, and the circuit thereof shown in Fig. 9.

Referring now to Figs. 7 and 8, reference numeral 50 indicates a synchronous motor having a shaft 51 through which gears 52 and 53 are driven. Gear 52 is fixed to the shaft 54 of an indicating device 55 which is rotated adjacent an opening 56 in the dial 57 for a purpose to be indicated presently.

The gear member 53 forms part of a clutch electrically controlled by the signal transmitted from the transmitting instrument already described. Thus, the gear 53 is secured to a shaft 58 normally urged in a left hand direction by a spring 59. When so urged, it is adapted to make clutching engagement at 60 with a member 61 integral with a gear 62 which meshes with a gear 63 secured to the shaft 64, which shaft carries the indicator 65. The electro-magnet 66 is adapted, when it is excited, to move the member 53 to the right, thus breaking the clutching engagement at 60. Naturally, this will interrupt the drive of the indicating member 65 through gears 62 and 63.

The action of the entire system will now be indicated as follows. Synchronous motors 50 and 30 operate at the same constant speed. The motor 30 acts to rotate the cup member 39 which sends forth two signals per cycle through mercury switch 28, which switch is in the circuit of electro-magnet 66. Thus, twice in each cycle of the cup member 39, the electro-magnet 66 will be excited for a small interval of time, it being preferable to have an interval of two seconds at the time that the lug 41 is contacted and four seconds at the time that the indicator 17 is contacted. The drive from the synchronous motor 50 to the indicator 65 will naturally be interrupted for a period of two seconds and a further period of four seconds during each cycle, and the gearing is so calibrated that the indicator 65 makes a complete rotation from its checking point 68 back to its checking point 68 and including its two stops, while the cup member 39 is making a complete cycle from the lug 41 which is really a checking lug, back to the lug 41. The relation of the movement of the member 65 to the movement of the cup 39 is such that when the two second stop is made by contact of the cup 39 with lug 41, the indicating hand 65 is at its checking point; and when the cup 39 is in contact with indicator 17, the indicating hand 65 is at a position relatively to dial 57 corresponding to the position of the indicators 12 and 17 relatively to dial 12a, its rate of movement being proportional to the movement of cup 39, and the dial 57 being properly calibrated.

It will thus be understood that the travel of the indicator 65 begins just after the two second stop created by the impulse sent through contact of lug 41 by the cup 39, and continues to the beginning of the long impulse sent out by contact of the indicator 17 with the cup member 39. The reading of the scale 57 is properly calibrated so that the time movement between the sending of impulses by the cup member 39 is proportional to the reading of indicator 17 so that at the time of the sending of the long impulse, the indicator 65 will be positioned at a point corresponding to the reading of indicator 17 and the indicating hand 12. The device 55 is especially useful in indicating the particular time interval during which indicator 65 is being held, each dot 55a thereon representing one second. Thus, when the hand 65 is stopped at the checking point 68, only two dots 55a will move past window 56 and will indicate that the hand should be at its checking point. Should the receiving instrument be out of synchronism, it will be quite easy to adjust it by simply moving the indicator 65 when the clutch 60 is disconnected. Other means may also be used for this purpose, such means being shown in my first application mentioned supra.

In Fig. 9, I illustrate the electrical connections of my system. Synchronous motors 30 and 50 are respectively fed by circuits 30a and 50a, and are adapted to be maintained in synchronism. Feed lines 70, 71 traverse electro-magnet 66 and the mercury switch 28. Naturally, when the circuit is closed at the mercury switch 28, the electro-magnet 66 will break the clutching engagement at 60, and, when the circuit is open at 28, the spring 59 will act to maintain the clutching engagement at 60.

I now claim:

1. In a device of the class described, a measuring hand movable in a measuring path, a signalling member mounted so that a portion thereof is always opposite said measuring hand, a signal actuating member adapted to move over the entire range of movement of said measuring hand, means for moving the actuating member over the said entire range, and means mounting said actuating member and signalling member whereby said actuating member actuates the signalling member through the intermediary of the measuring hand when it reaches the position of the measuring hand.

2. In a device of the class described having a measuring member adapted to move in a measuring path and a signal actuating means moving in fixed cycles relatively to said measuring member and adapted to send forth a signal in each cycle upon contacting said measuring member, that improvement which comprises using a signal actuating means and means mounting said means whereby an increment thereof moves substantially perpendicularly to the measuring path while the actuating means is moving along said path, whereby said increment contacts the measuring member perpendicularly, to its measuring path so as to avoid moving it in a measuring direction at the time of so contacting it.

3. In a device of the class described having a measuring member adapted to move in a measuring path and a signal actuating means moving in fixed cycles relatively to said measuring member and adapted to send forth a signal in each cycle upon contacting said measuring member, that improvement which comprises using a signal actuating means of cup form and means mounting said cup form means for peripheral rolling action in the measuring path whereby a constantly changing increment of said means moves substantially perpendicularly into the measuring path, whereby said increment when it encounters the measuring member, contacts it perpendicularly to its indicating path so as to avoid moving it in a measuring direction at the time of so contacting it.

4. A transmitting device comprising a transmitting member movable through fixed cycles, a measuring member adapted to be positioned in accordance with a quantity to be measured, means whereby a portion of said transmitting member rides into the plane of said measuring member to contact said measuring member once in each cycle, means whereby at least a portion of said measuring member is displaceable from its normal plane of movement by its contact with said measuring member, the direction of contacting of said measuring member by said transmitter member being such as to displace the measuring member from its normal plane of movement while not moving the indicating member in a measuring direction, and signalling means arranged for actuation by said movement of the measuring member.

5. In a device of the class described, a measuring hand arranged for easy flexing or bending in a plane perpendicular to its measuring movement, a signalling member mounted so that a portion thereof is opposite said hand in every possible indicating position of said hand, means mounting said signalling member for movement in a signalling direction when pressure is applied thereto from its surface facing the measuring hand, a signal actuating member of circular cup form, means mounting said signal actuating member for rolling movement through the path of said measuring hand and with the increment thereof approaching said measuring hand moving in a direction substantially perpendicular to said measuring hand, whereby said actuating member contacts and flexes the measuring hand perpendicularly to its normal movement and against the signalling member when its contacting increment reaches the position of said measuring hand, whereby to press the signalling member into signalling position.

6. In a device of the class described, the combination with a measuring instrument and scale and the measuring hand thereof, of a movable signal actuating member, means for moving the signal actuating member periodically over the range of travel of said measuring hand and into contact therewith, and means mounting said signal actuating member for compound movement through the range of travel of said hand and for movement substantially perpendicularly to the measuring hand when moving into and out of contact with said measuring hand.

7. In a device of the class described, a measuring member and means whereby it is movable in a measuring path, signal actuating means movable through the path of the measuring member so as to contact the measuring member at a point in its measuring path corresponding to the quantity indicated thereby and to send forth a signal at that point, and means for moving the signal actuating means substantially perpendicularly to the measuring path into contact with the measuring member while simultaneously moving said signal actuating means through the path of said measuring member.

8. In a device of the class described, an element movable in a path as a function of a value and arranged for easy flexing, pivoting or bending in a plane perpendicular to its path of movement, a signalling member mounted so that a portion thereof is opposite said element in every possible position of said element, means mounting said signalling member for movement when pressure is applied thereto from the surface facing the said element, a signal actuating member of circular cup form, means mounting said signal actuating member for rolling movement opposite every possible position of said element, and with the increment thereof approaching said element moving in a direction substantially perpendicular to said element, whereby said actuating member flexes the element perpendicularly to its normal movement and against the signalling member when its contacting increment reaches the position of said element, whereby to press the signalling member into signalling position.

9. In a device of the class described, an element movable in a path as a function of a value and arranged for easy flexing, pivoting or bending in a plane perpendicular to its path of movement, a signalling member arranged so that a portion thereof is opposite said element in every possible position of said element, means mounting said signalling member for movement when pressure is applied thereto from the surface facing the said element, a signal actuating member for applying pressure to said signalling member through the intermediary of the said element, means mounting said signal actuating member for movement opposite every possible position of said element and with an increment thereof always in juxtaposed relation to said element, and with the increment thereof always approaching said juxtaposed relation moving in a direction substantially perpendicular to said element, whereby said signal actuating member flexes the said element substantially perpendicularly to its normal movement and against the signalling member when its contacting increment reaches the position of said element.

10. In a device of the class described, a measuring hand movable in a circular path and arranged for easy flexing, pivoting or bending in a plane perpendicular to said path, a signal actuating member of circular cup form, means mounting said signal actuating member for cyclic rolling movement in the path of said measuring hand and with a constantly changing increment thereof always approaching said measuring hand in a direction substantially perpendicular to the said measuring path, whereby once in each cycle said actuating member is adapted to contact the measuring hand in a direction perpendicular to its normal movement whereby to send forth a signal without substantially deflecting the measuring hand from its true measuring position.

11. In a device of the class described, an element movable in a path as a function of a value and movable in a circular path, a signal actuating member of circular cup form, means mounting said signal actuating member for rolling movement relatively to the path of said element with a constantly changing increment thereof always approaching said element in a direction substantially perpendicular to the said path of said element, whereby said actuating member contacts the element perpendicularly to its normal movement so as to send forth a signal without deflecting the element from its then position.

12. In a device of the class described, a measuring hand arranged for easy flexing, pivoting, or bending in a plane perpendicular to its measuring movement, a signalling member mounted so that a portion thereof is opposite said hand in every possible measuring position of said hand, a serrated surface on said signalling member and on inner and outer sides of the hand facing the surface, means mounting said signalling member for movement in a signalling direction when pressure is applied thereto from the direction of said hand, a signal actuating member of circular cup form, means mounting said signal actuating member for movement into every possible measuring position of said hand, the edge of said signal actuating member being serrated and cooperable with the serrated surface of the hand and adapted to engage said hand surface and force said measuring hand against the signalling member, thus moving said signalling member in a signalling direction while not substantially disturbing the measuring position of said measuring hand.

13. In a device of the class described, an element movable in a path as a function of a value, a signalling member mounted so that a portion thereof is always opposite said element, means whereby said member is movable at right angles to the said path of said element to send forth a signal, signal actuating means, and driving means for moving said signal actuating means against the said element whereby to force it against the signalling member to move the signalling member to send forth a signal.

14. In a device of the class described, an element movable in a path as a function of a value, contact means moving through the path of said element and adapted to contact said element to send a signal indicating the position of said element relatively to the travel of said contact means, and means mounting said contact means for movement whereby an increment of said contact means moves substantially perpendicularly into the path of said element whereby to contact and possibly move the said element perpendicularly to its regular path without moving the same substantially in its regular path.

15. In a device of the class described, an element and means whereby it moves in a path as a function of a value, signal actuating means movable in cycles and adapted to contact said element in each cycle to send a signal, and means for moving the signal actuating means substantially perpendicularly to the path of said element and into contact with said element, whereby contact with the said element will not tend to move said element in the direction of its path.

FRANKLIN R. THOMPSON.